W. F. MAY.
MILK PAIL.
APPLICATION FILED MAY 27, 1918.
1,330,545.
Patented Feb. 10, 1920.
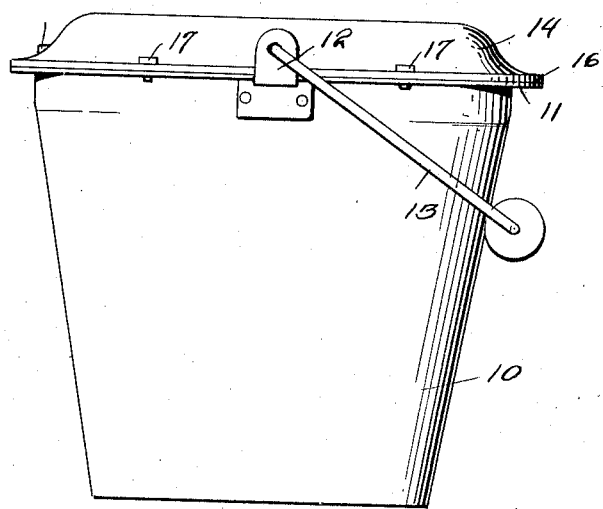
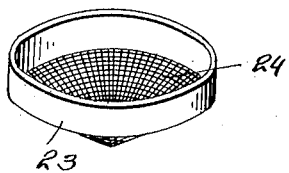
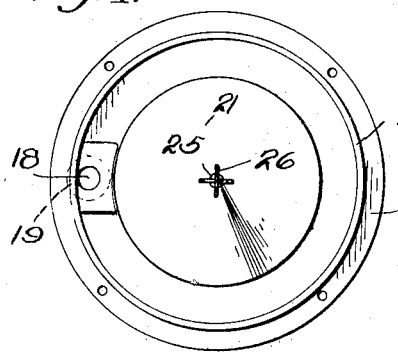
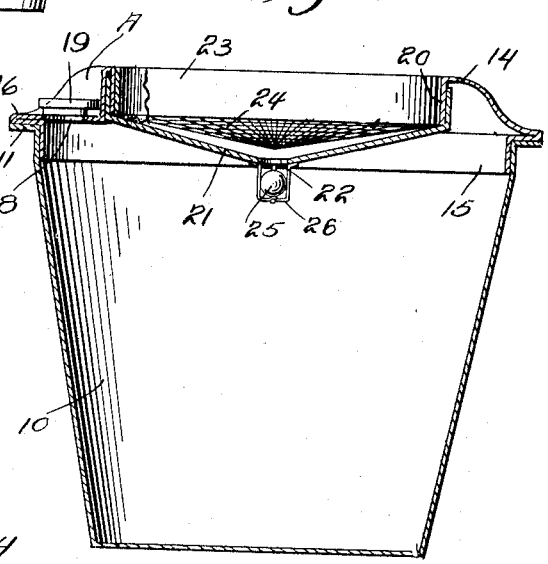
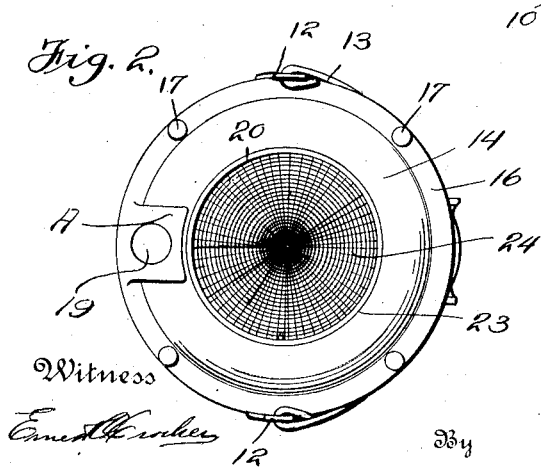
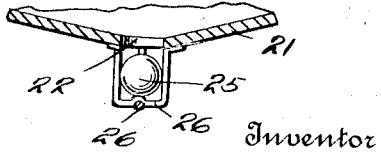
Inventor
W. F. May
Witness
Attorney

UNITED STATES PATENT OFFICE.

WILLIAM F. MAY, OF DETROIT, OREGON.

MILK-PAIL.

1,330,545.  Specification of Letters Patent.  Patented Feb. 10, 1920.

Application filed May 27, 1918. Serial No. 236,797.

*To all whom it may concern:*

Be it known that I, WILLIAM F. MAY, a citizen of the United States, residing at Detroit, in the county of Marion, State of Oregon, have invented certain new and useful Improvements in Milk-Pails; and I do hereby declare the following to be a full, clear, and exact description of the invention, such as will enable others skilled in the art to which it appertains to make and use the same.

This invention is an improvement in receptacles and has particular reference to a sanitary milk pail.

An object of the invention is to provide a novel construction of cover or lid which will permit of the pail being filled and the milk strained during the filling operation thereby removing impurities therefrom and also preventing other foreign matter from entering the pail.

Another object is to provide an improved cover or lid which will prevent spilling of the contents of the pail through accidental overturning and which will permit of the emptying of the pail without necessitating the removal of the cover or lid.

A further object is to provide a pail of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing wherein:—

Figure 1 is a side elevation of the pail constructed in accordance with the invention.

Fig. 2 is a top plan view.

Fig. 3 is a vertical sectional view.

Fig. 4 is a bottom plan view of the cover or lid.

Fig. 5 is a perspective view of the strainer.

Fig. 6 is an enlarged vertical section through the valve of the cover.

In the drawing, the numeral 10 indicates a pail or bucket which may be of any desired construction and which is provided at its upper end with an annular outstanding flange 11. The upper end of the pail or bucket may also be provided with the pivot ears 12 secured thereto at oppositely disposed points and supporting a bail or handle 13.

The cover or lid 14 which comprises the essential feature of the invention is shown in what is now believed to be its preferred form and consists of a frusto-conical body whose base has an inset pendant skirt 15 adapted to fit into the upper end of the pail or bucket 10 and an annular supporting flange 16 adapted to rest upon the flange 11 and be secured thereto by set screws or other fasteners 17. The cover is provided with an outlet opening 18 adjacent the outer edge thereof which is normally closed by a screw cap 19 which may be removed in order to empty the contents of the pail without removing the cover. The cover is depressed as shown at *a* to accommodate the cap 19.

The upper portion of the cover 14 is provided with a large central opening surrounded by a pendant flange 20, and around the latter is fastened the upper end of a hopper having a dished or centrally inclined bottom 21 provided with a central opening 22 therein for permitting strained milk passing through the cover into the pail 10. The flange 20 is adapted to receive the rim 23 of a strainer having a wire mesh bottom 24 dished to a slightly lesser degree than the bottom 21 of the hopper and supported thereabove in spaced relation whereby the milk will readily pass through the mesh bottom 24 and then fall upon the bottom 21 and drain through the opening 22 into the pail. It is evident that the strainer may be removed for cleansing whenever desired and readily placed in its proper position within the flange 20 and that the milk which is poured into the device will be thoroughly strained before entering the pail.

For the purpose of preventing the milk being spilled from the pail in the event that the same should be turned over, there is preferably provided a ball valve 25 supported below the opening 22 in a cage formed by the cross wires 26 bent in U-shaped formation and having their ends secured to the bottom of the cover 14. By reason of this construction it will be apparent that the ball valve 25 will, when the pail is in its upright position, be prevented from closing the opening 22 but should the pail be upset it will be obvious that the valve will move to a closing position with respect to said opening 22 and thus prevent any of the milk within the pail from passing through the opening and cover. The milk is poured from the pail through the outlet opening 18 by removing the cap 19.

What is claimed is:

In a cover for milk pails, the combination with a frusto-conical body having a skirt and flange at its base to engage with the mouth of the pail and an opening at its smaller end surrounded by a depending flange, said body also having an outlet opening at one point, and a removable closure for this opening; of a hopper whose upper end is engaged around said depending flange and whose bottom descends to a central opening, an upwardly closing check valve controlling this opening, and a strainer having a rim fitting removably within said depending flange and a mesh bottom dished to a less degree than the bottom of the hopper.

In testimony whereof I affix my signature, in the presence of two witnesses.

WILLIAM F. MAY.

Witnesses:
G. A. SPENCER,
B. M. SMITH.